(12) United States Patent
Kobori et al.

(10) Patent No.: US 7,787,167 B2
(45) Date of Patent: Aug. 31, 2010

(54) DISPLAY APPARATUS USING MICRO MIRROR UNIT, AND METHOD FOR CONTROLLING MICRO MIRROR UNIT

(75) Inventors: Tomoki Kobori, Kamakura (JP); Satoshi Ouchi, Kamakura (JP); Koji Hirata, Yokohama (JP); Hidehiro Ikeda, Yokohama (JP); Kazuo Shikita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 18 days.

(21) Appl. No.: 12/367,662

(22) Filed: Feb. 9, 2009

(65) Prior Publication Data

US 2009/0237627 A1 Sep. 24, 2009

(30) Foreign Application Priority Data

Mar. 19, 2008 (JP) ............................. 2008-070585

(51) Int. Cl.
*G02B 26/08* (2006.01)
*G03B 21/28* (2006.01)
(52) U.S. Cl. ................. 359/223.1; 359/212.1; 359/900; 353/98
(58) Field of Classification Search ............. 359/196.1, 359/197.1, 223.1, 225.1, 226.2, 212.1, 212.2, 359/213.1, 214.1, 900; 353/98
See application file for complete search history.

(56) References Cited

U.S. PATENT DOCUMENTS 7,660,044 B2 * 2/2010 Kajita et al. ................. 359/630
2008/0297868 A1 * 12/2008 Mizumoto ................... 359/199

FOREIGN PATENT DOCUMENTS

JP 2006-343397 12/2006

* cited by examiner

*Primary Examiner*—Jack Dinh
(74) *Attorney, Agent, or Firm*—Townsend and Townsend and Crew LLP

(57) ABSTRACT

In a method for driving a micro mirror such as MEMS mirror and a display apparatus using the method, there are provided a mirror driving unit for driving the micro mirror which operates in a resonant mode and a nonresonant mode, a driving-condition setting unit for setting a mirror driving condition, a switching unit for switching on/off a mirror driving signal in the nonresonant mode, and a look-up table for indicating the relationship of a mirror response with respect to the driving condition already known in advance. The switching unit controls the transmission of the nonresonant-mode mirror driving signal while grasping the mirror response state with respect to the mirror driving signal, thereby finely increasing and decreasing a driving torque for the micro mirror. This fine increase and decrease allows the micro mirror to be fluctuated stably, and a further enhancement in the fluctuation rate.

2 Claims, 7 Drawing Sheets

FIG.1 (CONFIGURATION OF 1:SW)

(CONFIGURATION OF 2: AMP)

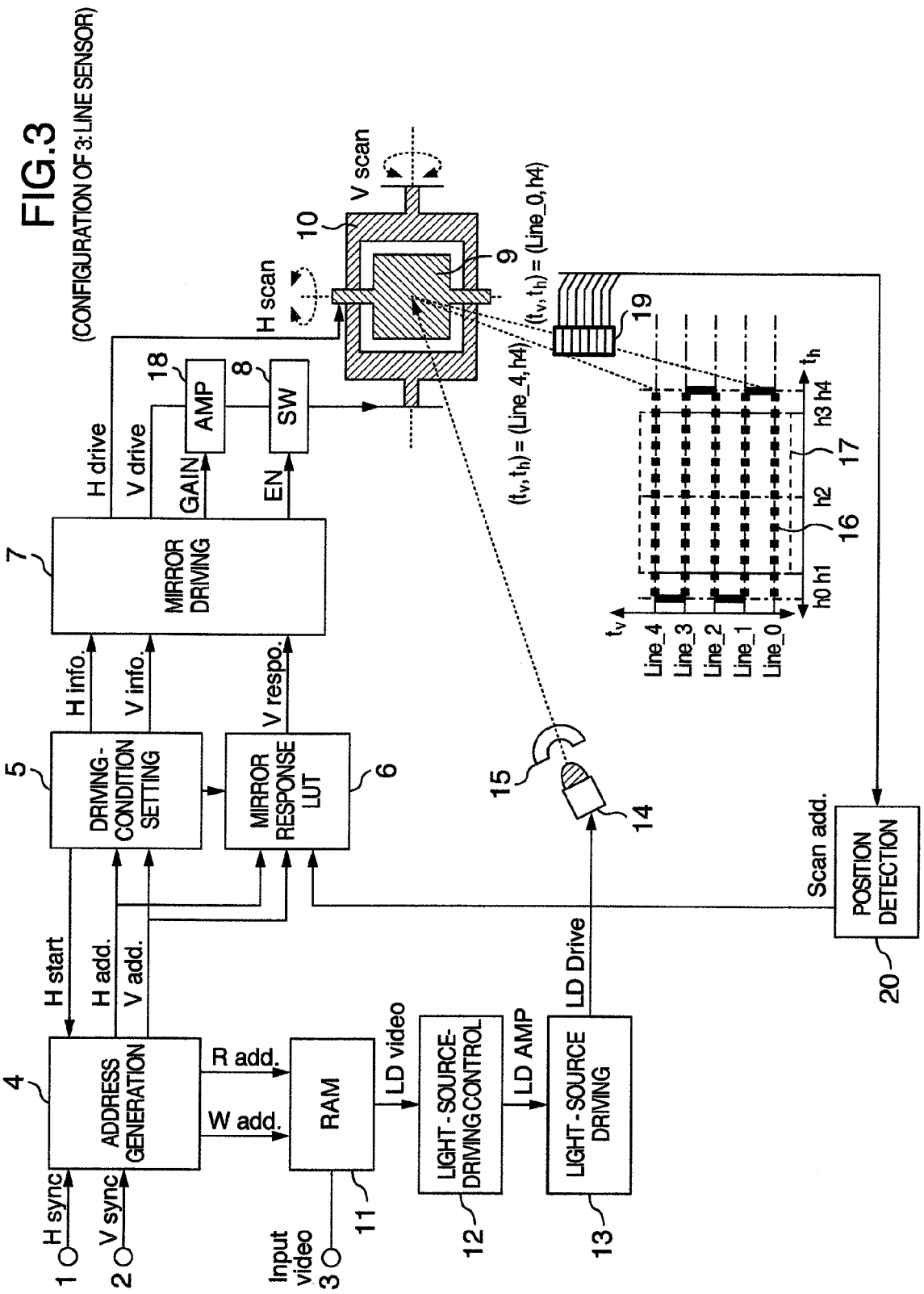
FIG.3 (CONFIGURATION OF 3: LINE SENSOR)

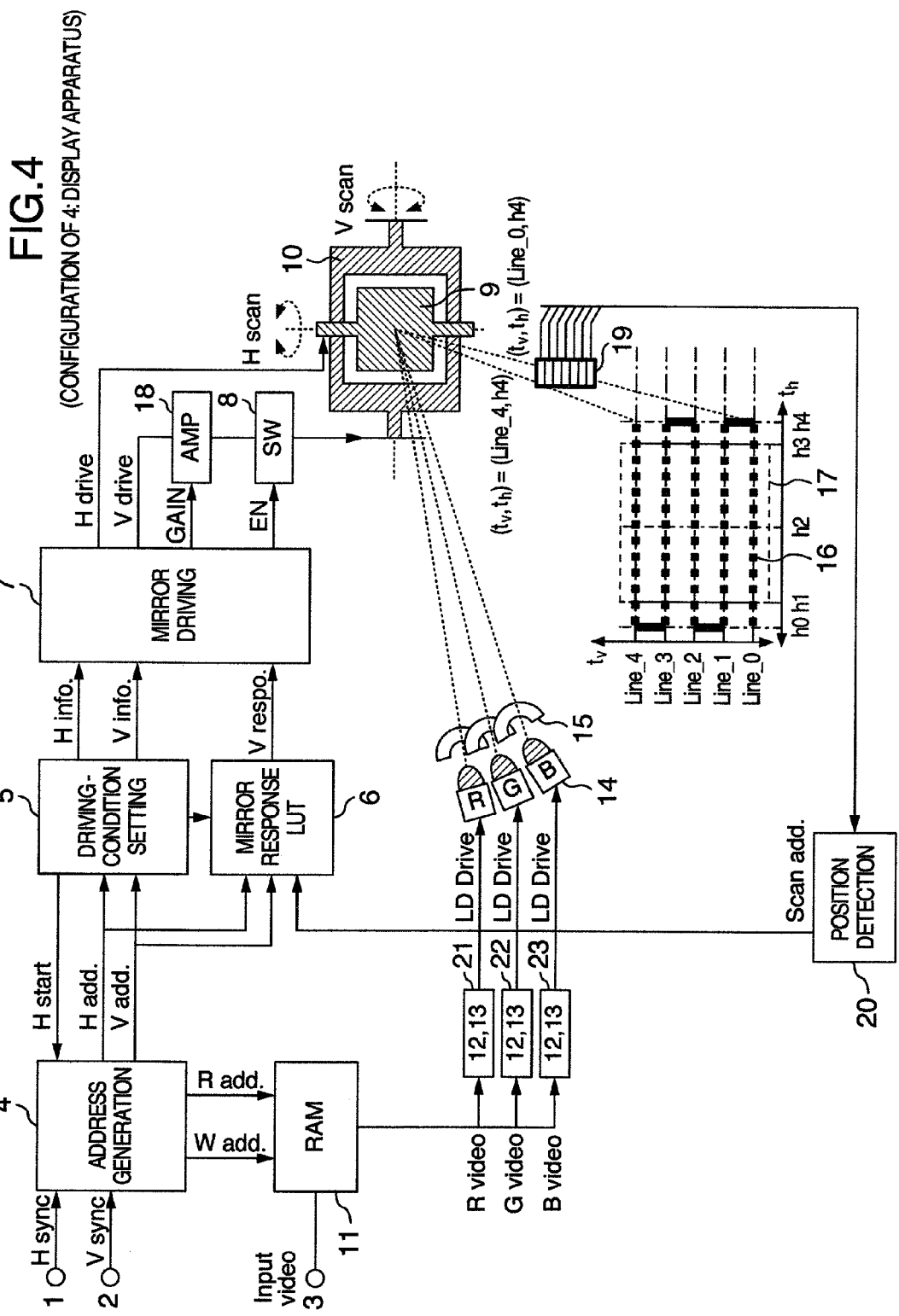
FIG.4 (CONFIGURATION OF 4: DISPLAY APPARATUS)

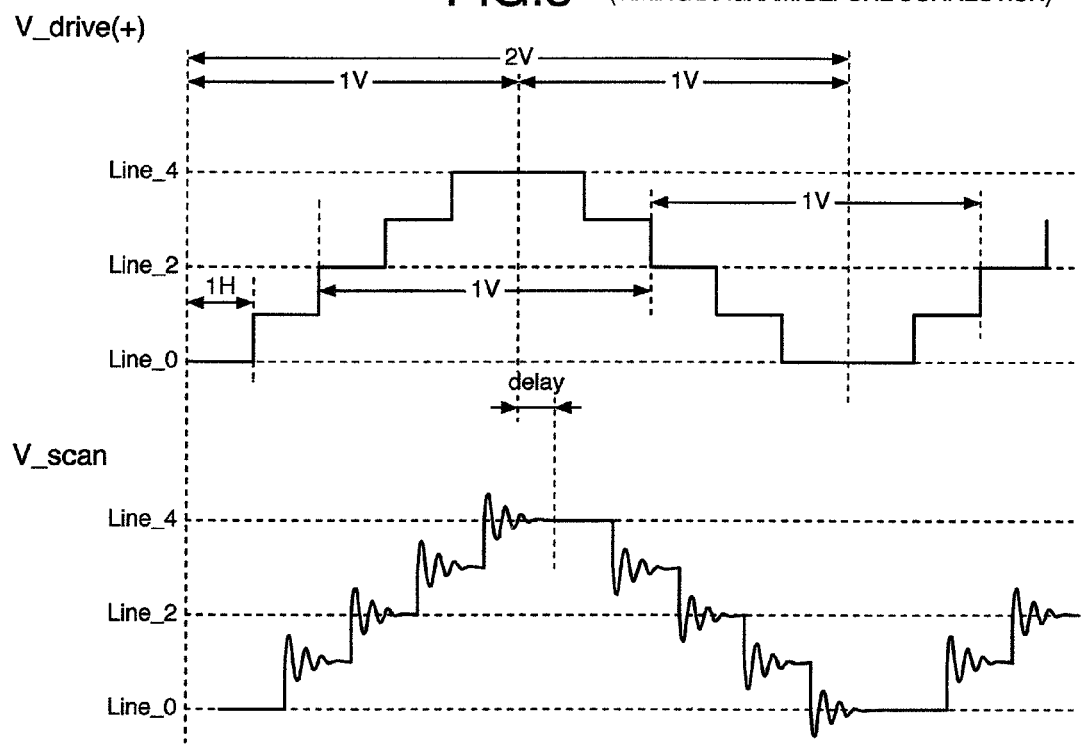
FIG.5 (TIMING DIAGRAM: BEFORE CORRECTION)
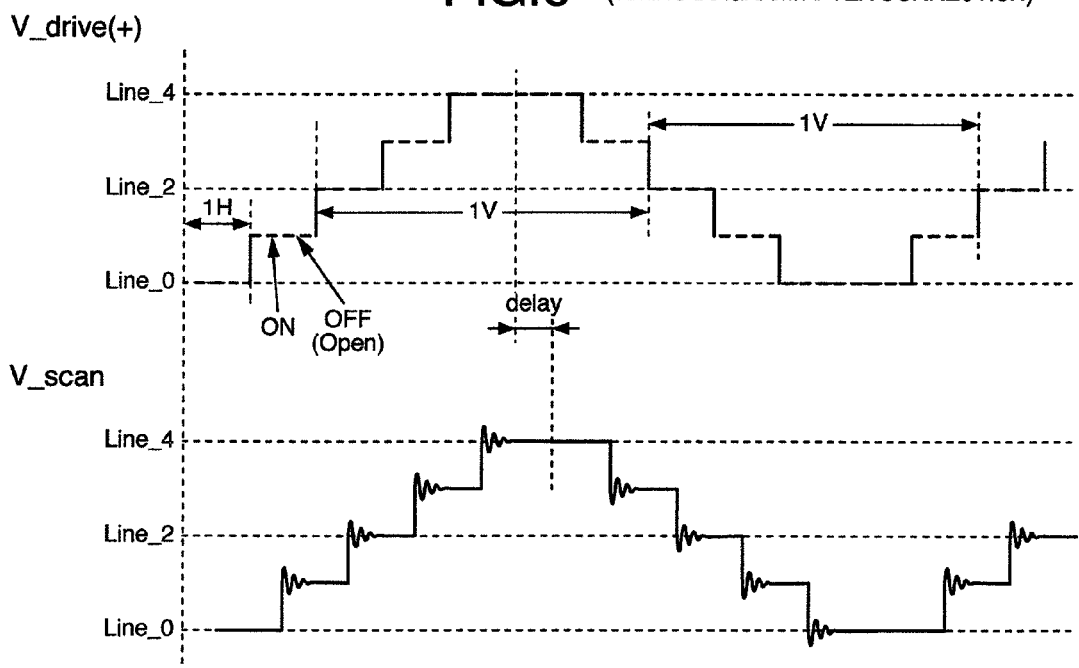
FIG.6 (TIMING DIAGRAM: AFTER CORRECTION)

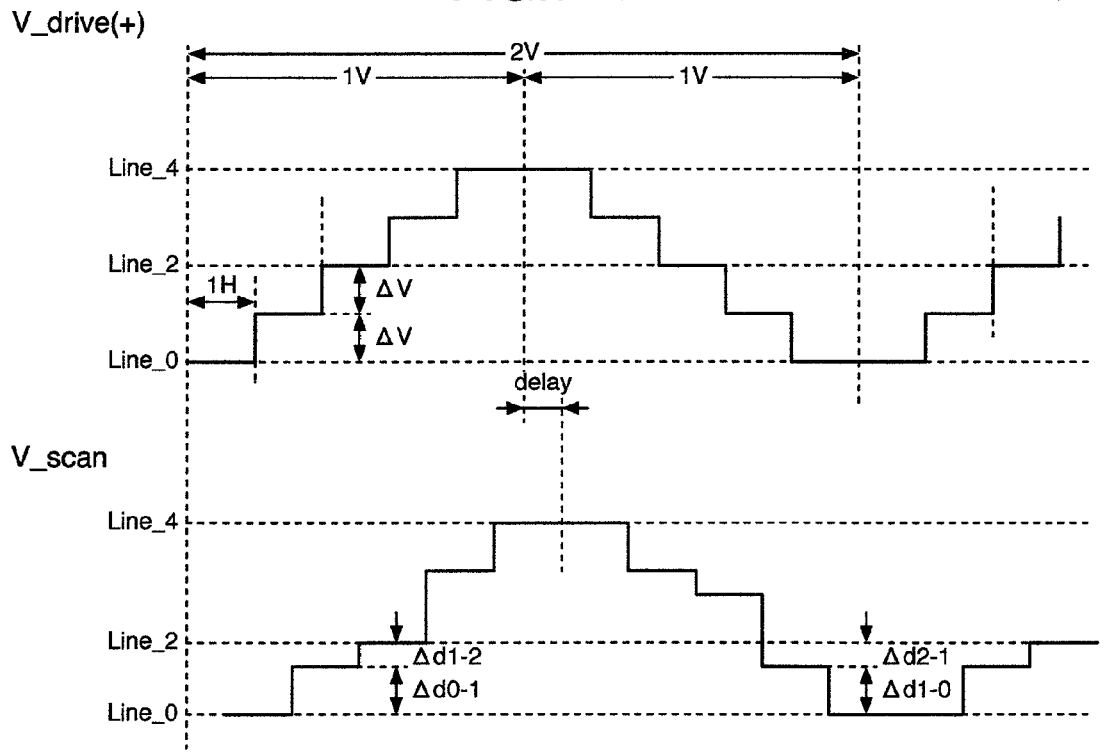
FIG.7 (TIMING DIAGRAM: BEFORE CORRECTION)
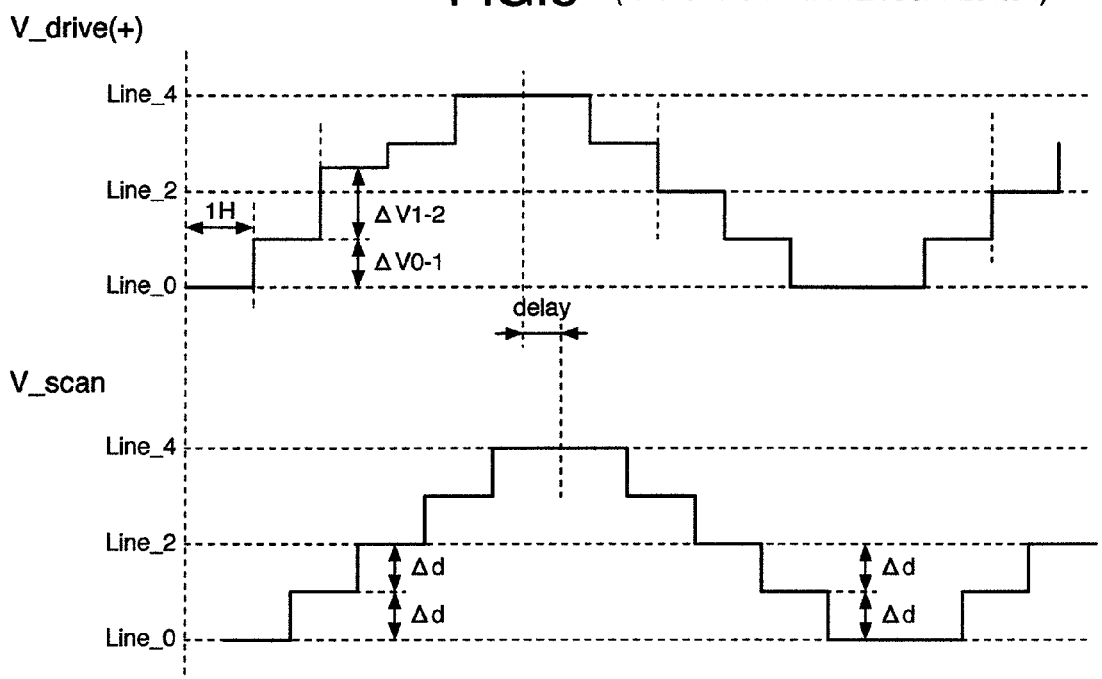
FIG.8 (TIMING DIAGRAM: AFTER CORRECTION)

FIG.9 (TIMING DIAGRAM)
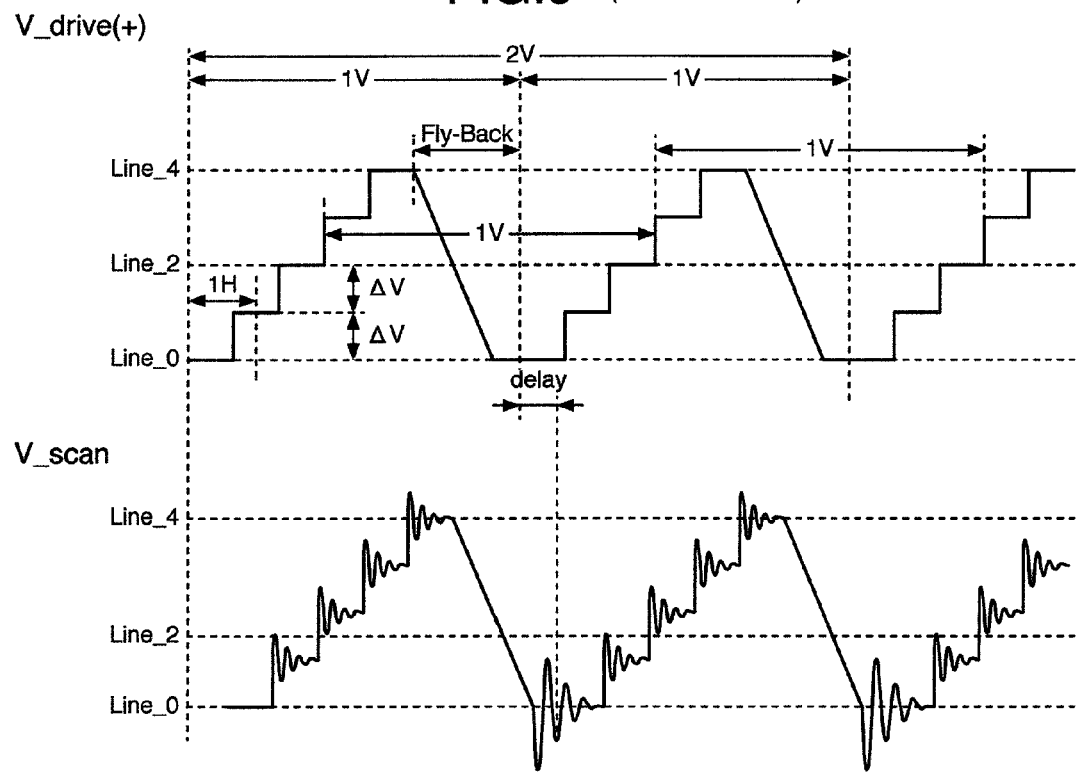
FIG.10 (TIMING DIAGRAM)
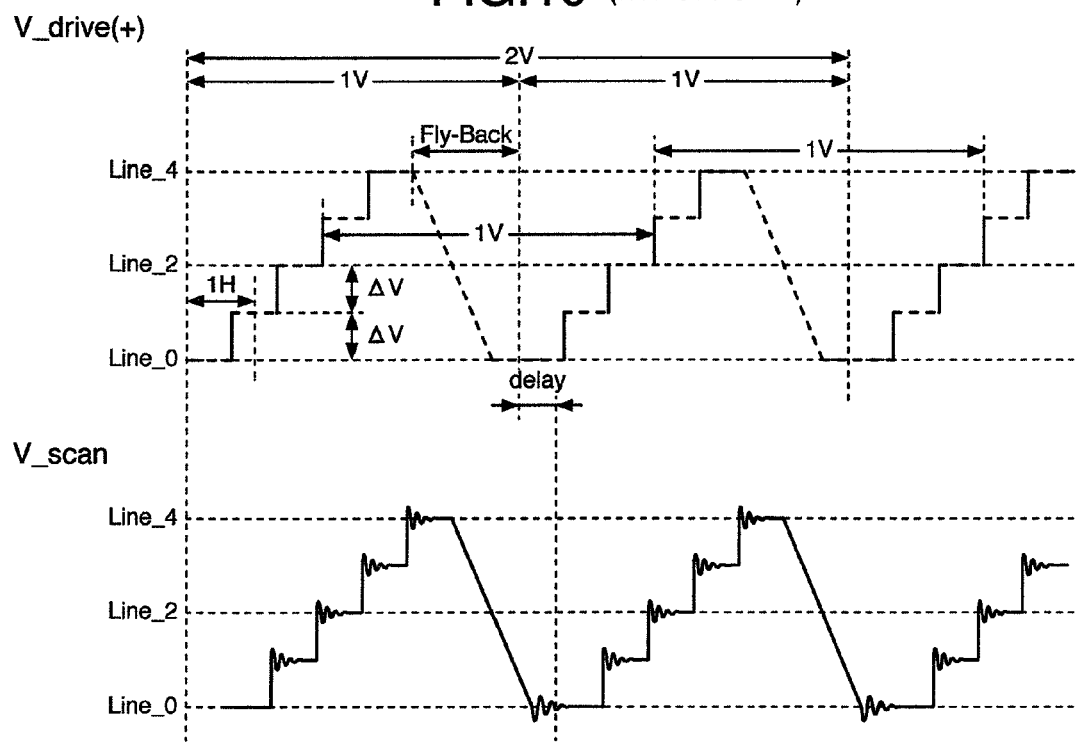

DISPLAY APPARATUS USING MICRO MIRROR UNIT, AND METHOD FOR CONTROLLING MICRO MIRROR UNIT

CROSS-REFERENCE TO RELATED APPLICATION

This application claims priority from Japanese Patent Application JP P2008-070585, filed on Mar. 19, 2008, the content of which is hereby incorporated by reference into this application.

BACKGROUND OF THE INVENTION

The present invention relates to a display apparatus for implementing projection display using reflected light from mirrors.

An image projection apparatus for projecting an image onto a screen by performing a raster scan of laser light using MEMS resonant mirrors has been considered to be expanded not only for business and industry usages, but also for consumer products. This has arisen from the recent technical developments in the MEMS (Micro Electro Mechanical Systems) technology and semiconductor laser technology, and small-sized and low-cost implementation of the apparatus. These technologies are disclosed in documents such as, e.g., JP-A2006-343397.

In JP-A-2006-343397 (page 10, FIG. 1), the following technology is disclosed: In a case of projecting an image onto the screen by performing the raster scan with the laser light in such a manner that the MEMS mirrors operating in a resonant mode are used for the horizontal-direction scan, and the MEMS mirrors operating in a nonresonant mode are used for the vertical-direction scan. In this case, light-emission intensity of the laser light is adjusted in correspondence with a change in scan rate of the MEMS mirrors operating in the resonant mode.

Moreover, there is disclosed in JP-A-2006-343397 a method that brightness of the image is made uniform on the screen by making use of a stable area which remains after the nonresonant-mode MEMS mirrors have responded in a step-like manner.

SUMMARY OF THE INVENTION

In the case of configuring the above-described image display apparatus for implementing the projection display by using the MEMS mirror which perform a reciprocating vibration on one axis or two axes, and by projecting the reflected light onto a target object, the reflected light being acquired by illuminating the light beam onto the MEMS mirror. In this case, it is becoming increasingly easier to manufacture the image display apparatus at low cost, and to implement an enhancement in the color reproduction range and the high luminance, the semiconductor technology has progressed in recent years and resulted in an enhancement in the output energy and photoelectric conversion efficiency of the laser power source, and an enhancement in selectivity of oscillated wavelength within the visible light range. Also, various methods have been proposed as the MEMS driving method, such as electromagnetic method, electrostatic method, and piezoelectric method.

There exists a problem, however, that fluctuation rate of the MEMS reflection mirrors finds it difficult to achieve high-resolution implementation of the displayed image due to the operation performance of the current MEMS devices.

Although the raster-scan display method is basically the same as the conventional CRT television method, in a display system where light-accumulation effect by a fluorescent substance cannot be expected, image reproduction is implemented by utilizing the after-image effect of human eyes. In this case, however, light blinks by a unit of frame frequency, which, ultimately, may suffer a problem of being visually recognized as flicker.

It is an object of the present invention to provide a mirror driving method and a display apparatus using the same method wherein, when accomplishing the high-resolution implementation of a displayed image, or a reduction in the visibility of the flicker by increasing the fluctuation rate of the nonresonant-mode MEMS mirror, a stable displayed image is reproduced by driving the MEMS mirror more stably than conventionally.

In order to solve the above-described problems, a first display apparatus of the present invention is provided as follows: Namely, there is provided a display apparatus for projecting display by projecting reflected light onto a target object, the reflected light being acquired by illuminating a light beam onto a mirror which performs a reciprocating vibration on one axis or two axes, the display apparatus including a mirror driving unit for driving the mirror which operates in at least the resonant mode and the nonresonant mode, a driving-condition setting unit for setting a mirror driving condition, a look-up table (LUT) for indicating the relationship of a mirror response with respect to a driving condition already known in advance, a modulation unit which is configured with a switching unit for switching on/off the transmission of a nonresonant-mode mirror driving signal with an intermittent time from 0% to 100%, a light source for illuminating the light onto the mirror, a light-source-driving controlling unit, and a light-source driving unit, wherein with reference to the look-up table, a driving torque for the mirror with respect to the driving condition is grasped, then modulation information is instructed to the modulation unit. In the modulation unit configured with the switching unit acquiring the modulation information, by exerting an ON/OFF control over the transmission of the nonresonant-mode mirror driving signal from the mirror driving unit, generation of a driving torque can be suppressed. In this case, inertia of the mirror is utilized. The ON/OFF control is executed at a higher rate than the inertia. A time integral effect allows the reduction of the generated driving torque.

In a second display apparatus of the present invention, the modulation unit in the first display apparatus of the present invention is configured with an amplification unit for increasing/decreasing the transmission amount of the nonresonant-mode mirror driving signal. The modulation unit acquires the modulation information, and then, using the amplification unit, suppresses or amplifies the transmission amount of the nonresonant-mode mirror driving signal in a range of 0 times to 2 times. In this case, the generated driving torque for the micro mirror is continuous in time.

A third display apparatus of the present invention further includes a light reception unit which is configured by arranging a plurality of light reception units in a line, and a position detection unit for identifying, from a detection result by the light reception unit, the position of a light reception unit which has received the light.

The light reception unit is disposed such that the light beam, which is emitted from the light source and reflected by the mirror, is received in a direction in which the mirror operates in the nonresonant mode. Also, the individual light reception units are disposed such that a displacement in the nonresonant mode can be decomposed sufficiently.

The position detection unit identifies the fluctuation position in the nonresonant-mode direction. With reference to the look-up table and by using the modulation unit, the transmission amount of the nonresonant-mode mirror driving signal is controlled so that the fluctuation position reaches a desired fluctuation position.

A fourth display apparatus of the present invention includes light-source-driving controlling units and light-source driving units corresponding to at least three primary colors of R/G/B. The fourth display apparatus further includes an address generation unit for generating address information by acquiring an external image signal, and identifying an operation position of the reflected light which performs the reciprocating vibration on one axis or two axes, and an image-signal conversion unit for selecting an image signal at a position corresponding to the present address information, and modulating the light amount for each R/G/B light source based on brightness information on each R/G/B image signal, wherein the fourth display apparatus for projecting displays by projecting the reflected light which is modulated based on the position of the reciprocating-vibration and the image signal.

Hereinafter, using other expressions, the explanation will be given below concerning the above-described configurations.

In a mirror driving method for a display apparatus, the display apparatus including a light source, a light-source driving unit for driving the light source, a light-source-driving controlling unit for controlling the light-source driving unit, a mirror which vibrates on one axis or two axes for reflecting illumination light from the light source thereby to project the illumination light onto a target object, a mirror driving unit for driving the mirror such that the mirror vibrates in a nonresonant mode, a driving-condition setting unit for setting a driving condition for the mirror driving unit, and a modulation unit for outputting a mirror driving signal for the mirror driving unit, the transmission amount of the mirror driving signal is controlled such that a driving torque for driving the mirror changes in a predetermined magnitude.

Also, in the mirror driving method, there is provided a look-up table (LUT) for indicating the relationship of the response of the mirror driving with respect to a predetermined driving condition. By making reference to the look-up table, the transmission amount of the mirror driving signal is controlled such that generation of a driving torque is reduced with respect to a driving condition, and resultingly, a displacement that allows the mirror to perform a desired vibration operation is acquired.

In a display apparatus including a light source, a light-source driving unit for driving the light source, a light-source-driving controlling unit for controlling the light-source driving unit, a mirror which vibrates on one axis or two axes for reflecting illumination light from the light source thereby to project the illumination light onto a target object, a mirror driving unit for driving the mirror such that the mirror vibrates in a nonresonant mode, a driving-condition setting unit for setting a driving condition for the mirror driving unit, and a modulation unit for outputting a mirror driving signal for the mirror driving unit, the modulation unit includes a switching unit for switching on/off the transmission of the mirror driving signal in the nonresonant mode, the switching unit controlling the transmission of the nonresonant-mode mirror driving signal with an intermittent time from 0% to 100% so that a driving torque for the mirror changes in a predetermined magnitude.

Also, in the display apparatus, the modulation unit includes an amplification unit for changing the transmission amount of the nonresonant-mode mirror driving signal, the amplification unit controlling the transmission amount of the nonresonant-mode mirror driving signal being amplified within a range of 0 times to 2 times so that the driving torque for the mirror changes in the predetermined magnitude.

Also, in the display apparatus, there are provided a light reception unit which is configured by arranging a plurality of light reception units in a line, and a position detection unit for identifying the position of a light reception unit which has received the light in the light reception unit, the modulation unit controlling the transmission amount of the nonresonant-mode mirror driving signal such that the vibration position of the mirror detected by the position detection unit becomes a desired vibration position, so that the driving torque for the mirror changes in the predetermined magnitude.

Also, in the display apparatus, there are provided the light-source driving units corresponding to at least three primary colors of R/G/B, the light-source-driving controlling unit corresponding to at least the three primary colors of R/G/B, an address generation unit for generating address information by acquiring an external image signal, and identifying operation position of the reflected light which vibrates on one axis or two axes, and an image-signal conversion unit for selecting an image signal at a position corresponding to the address information, and modulating the light amount for each R/G/B light source based on brightness information on each R/G/B image signal, wherein the display apparatus projects the reflected light which is modulated based on the vibration position and the image signal.

Also, in the display apparatus, there is provided a look-up table (LUT) for indicating the relationship of the response of the mirror driving with respect to a predetermined driving condition. By making reference to the look-up table, the transmission amount of the mirror driving signal is controlled such that generation of a driving torque is reduced with respect to a driving condition, and resultingly, a displacement that allows the mirror to perform a desired vibration operation is acquired.

As described above, according to the present invention, it becomes possible to provide the display apparatus for implementing the projection display with the use of the reflected light from the mirror which has achieved further enhancements in the picture quality and the performance than conventionally.

Other objects, features and advantages of the invention will become apparent from the following description of the embodiments of the invention taken in conjunction with the accompanying drawings.

BRIEF DESCRIPTION OF THE DRAWINGS

FIG. 3 is a configuration diagram of a third embodiment of the display apparatus according to the present invention;

FIG. 4 is a configuration diagram of a fourth embodiment of the display apparatus according to the present invention;

FIG. 5 is a timing diagram for supplementing the first embodiment according to the present invention;

FIG. 6 is a timing diagram for supplementing the first embodiment according to the present invention;

FIG. 7 is a timing diagram for supplementing the second embodiment according to the present invention;

FIG. 8 is a timing diagram for supplementing the second embodiment according to the present invention;

FIG. 9 is a timing diagram for supplementing the first embodiment according to the present invention; and FIG. 10 is a timing diagram for supplementing the first embodiment according to the present invention.

DESCRIPTION OF THE INVENTION

Hereinafter, referring to the accompanying drawings, the explanation will be given below concerning the embodiments based on the present invention.

Hereinafter, a micro mirror is selected and employed as the above-described mirror. Also, it is assumed that the above-described mirror or the micro mirror is of a rectangular shape, and is approximately 1 mm to 1.5 mm in its side size. It is assumed, however, that a range of approximately 2 mm to 3 mm is also allowable when carrying out the following embodiments.

Moreover, a range of approximately 10 μm to 5 mm is also allowable, depending on the size of a display displayed by the projection of light onto a target object such as a screen.

Also, it is allowable that the above-described mirror or the micro mirror is assumed to be the mirror (which, hereinafter, will be referred to simply as "MEMS mirror") used in the MEMS (Micro Electro Mechanical Systems) technology.

Embodiment 1

Figure 1:
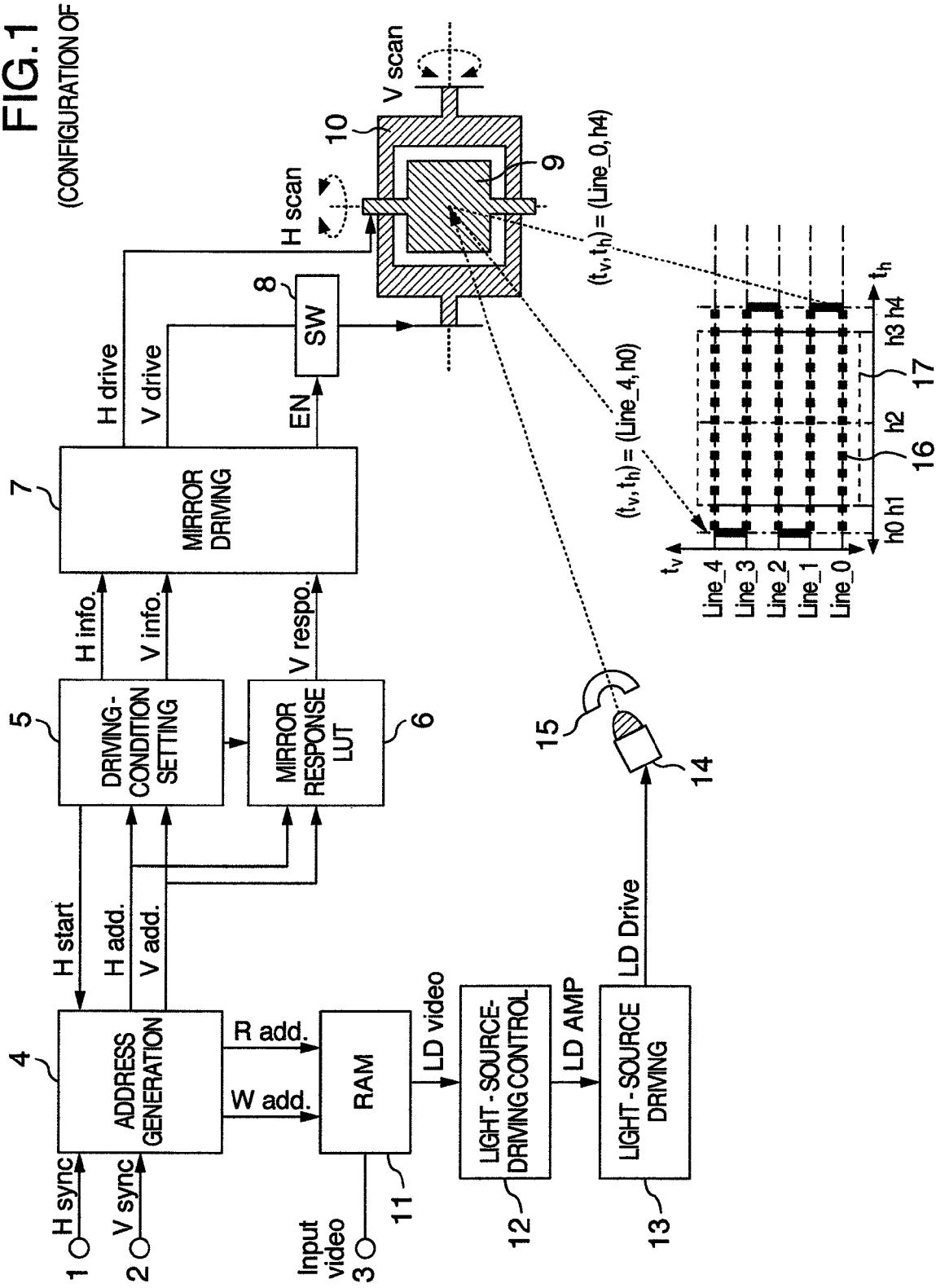
FIG. 1 is a configuration diagram of a first embodiment of the display apparatus according to the present invention.

FIG. 1 illustrates a block diagram for illustrating a first embodiment of the display apparatus according to the present invention, and an example state of a trajectory along which a beam-like light flux moves. Here, the light flux is reflected by a micro mirror which vibrates on two axes.

FIG. 5 and FIG. 6 illustrate states before and after corrections for a mirror driving signal $V\_{drive}$ in a nonresonant mode and an operational state $V\_{scan}$ of the micro mirror.

FIG. 9 and FIG. 10 illustrate the states implemented before and after the corrections for the nonresonant-mode mirror driving signal $V\_{drive}$ and the micro-mirror operational state $V\_{scan}$, in the case where the nonresonant mode is divided into an image display time-interval and a nondisplay time-interval fly-back, and where micro-mirror operation displacements are allocated to a large portion in order to shorten the nondisplay time-interval fly-back.

In FIG. 1, the reference numerals denote the following configuration components, respectively: 1 an input H synchronization signal $H_{sync}$ from the outside, 2 an inputted V synchronization signal $V_{sync}$ from the outside, 3 an inputted video signal from the outside, 4 an address generation unit, 5 a driving-condition setting unit, 6 a mirror response LUT (: Look-Up Table), 7 a mirror driving unit, 8 a switch (SW), 9 a micro mirror, 10 a H-vibration-and-V-vibration generation unit, 11 a RAM, 12 a light-source-driving controlling unit, 13 a light-source driving unit, 14 a light source, 15 a beam-light generation lens, 16 a scan trajectory of a light beam, and 17 a display area.

Hereinafter, in the drawing, the relationship between vibration directions of the micro mirror 9 and the light-beam scan trajectory 16 will be explained, defining the up-and-down direction as the V vibration and the right-and-left direction as the H vibration.

Also, the H vibration performs the fluctuation operation in the resonant mode; whereas the V vibration performs the fluctuation operation in the nonresonant mode which includes a displacement time-interval and a retention time-interval.

The H vibration operates at a sufficiently higher rate than the V vibration does. For example, displaying a substantially VGA (i.e., 640-pixel×480-line) image at a 60-Hz update rate corresponds to that the H vibration becomes equal to 15 kHz or more, and that the V vibration becomes equal to 30 Hz or more. Accordingly, the H vibration occurs at 250 times or more within the half period of the V vibration.

In the present embodiment, for simplicity of explanation, the explanation will be given below selecting a case where the H vibration occurs at 2.5 times. Also, in association with the light-beam scan trajectory 16 in the drawing, the V vibration is represented by Line_0, Line_1, Line_2, Line_3, and Line_4, and the H vibration is represented by h_0, h_1, h_2, h_3, and h_4 as time scales at the time of operating in the normal vibrations.

Also, the explanation will be given below employing, as the light source used in the present embodiment, a laser light source which emits a beam light, and which facilitates a high rate modulation of the light-amount. Of course, it is needless to say that any of a LED, super-high-pressure mercury lamp, and no-electrode lamp may be used along with an optical component for condensing the light into a beam-like manner and a light-amount modulation component.

In the embodiments of the present invention, it will not be referred as to the shape of the micro mirror 9, configuration such as one axis or two axes, and micro operation scheme. In the present embodiment, however, for simplicity of explanation, the explanation will be given limiting the case into a MEMS panel where the two-axis and square-shaped micro mirror 9 vibrates (fluctuates). Of course, the other configurations are also employable.

First, acquiring the inputted H synchronization signal $H_{sync}$ 1 and input V synchronization signal $V_{sync}$ 2 from the outside, the address generation unit 4 generates a write address W add. into the RAM 11, thereby memorizing and retaining the input video signal 3 into the RAM 11.

Simultaneously, the address generation unit 4 generates a V-vibration reference signal (i.e., $V_{start}$) for the micro mirror 9, using, as the reference, a H-vibration reference signal $H_{start}$ that is synchronized with a frequency at which the micro mirror 9 fluctuates in the resonant mode.

In this case, the H-vibration reference signal $H_{start}$ may also be synchronized with the input V synchronization signal $V_{sync}$ 2. Moreover, the address generation unit 4 generates a read address $R_{add.}$ which is synchronized with the present reference signals V start and $H_{start}$, and coincides with a horizontal display coordinate $H_{add.}$, a vertical display coordinate $V_{add.}$, and the present display coordinate, thereby reading the video signal (i.e., LD video) from the RAM 11.

Having acquired the horizontal display coordinate $H_{add.}$ and the vertical display coordinate $V_{add.}$, the driving-condition setting unit 5 selects a H-vibration condition $H_{info}$ and a V-vibration condition $V_{info}$ which are optimum for driving the micro mirror 9. Simultaneously, the driving-condition setting unit 5 generates the above-described H-vibration reference signal $H_{start}$.

Furthermore, in the mirror response LUT 6, a look-up table (LUT) is prepared which is used for indicating the relationship between a generated driving torque for the micro mirror 9 with respect to an already known driving condition set by the driving-condition setting unit 5, and the transmission amount (i.e., suppression amount) of the generated driving torque. Having acquired the horizontal display coordinate $H_{add.}$ and the vertical display coordinate $V_{add.}$, the mirror response LUT 6 generates a modulation amount $V_{respo}$ for instructing magnitude of the transmission amount of the non-resonant-mode mirror driving signal $V\_{drive}$.

Having acquired the modulation amount $V_{respo}$, the mirror driving unit 7 generates the mirror driving signals $H\_{drive}$ and $V\_{drive}$, and switch information EN for switching on/off the transmission of the nonresonant-mode mirror driving signal $V\_{drive}$. Based on the switch information EN, the SW 8 switches on/off the transmission of the mirror driving signal $V\_{drive}$, then applying the switched-on/off mirror driving signal $V\_{drive}$ to the H-vibration-and-V-vibration generation unit 10. This application allows the two-axis vibration driving of the micro mirror 9.

This ON/OFF control suppresses the generation of the driving torque. In this case, inertia of the micro mirror 9 is utilized. The ON/OFF control is executed at a higher rate than the inertia. Time integral effect allows the suppression of the generation of the driving torque.

FIG. 5 illustrates the nonresonant-mode mirror driving signal $V\_{drive}$ and the micro-mirror operational state $V\_{scan}$ at the ON time when the SW 8 transmits whole of the mirror driving signal $V\_{drive}$. When the displacement and the retention are repeated in every horizontal scan, fluttering-like variations occur in the micro-mirror operation during transition time-intervals.

Meanwhile, as illustrated in FIG. 6, exerting the ON/OFF control (which is indicated by dashed lines) over the mirror driving signal $V\_{drive}$ allows the suppression of the driving torque for the micro mirror 9, thereby suppressing the occurrence of the fluttering-like variations. In the drawing, a case is illustrated where the ON/OFF control is exerted with a 50-% intermittent time, i.e., with the equal time-interval (which is denoted by dashed lines). The time-interval, however, is determined appropriately so that the occurrence of the fluttering-like variations is suppressed. The present condition concerned is instructed by the mirror response LUT 6.

Also, in the case where the nonresonant mode is divided into the image display time-interval and the nondisplay time-interval fly-back, and where many of the micro-mirror operation displacements are allocated in order to shorten the nondisplay time-interval, as illustrated in FIG. 9, the driving torque becomes significantly larger in the nondisplay time-interval fly-back. This significantly larger driving torque, eventually, exerts the fluttering-like variation of the operation all the way to the image display time-interval. As illustrated in FIG. 10, however, exerting the ON/OFF control (which is denoted by dashed lines) over the mirror driving signal $V\_{drive}$ allows the suppression of the driving torque for the micro mirror, thereby suppressing the occurrence of the fluttering-like variations. Although the case with the 50-% intermittent time is illustrated, the present invention is of course not limited thereto. The optimization is performed depending on the driving method and the shape of micro mirror.

Meanwhile, the light-source-driving controlling unit 12 acquires an amplification ratio which is suitable for the display coordinates ($H_{add.}$ and $V_{add.}$), thereby amplifying the display vibration LD video. Then, the unit 12 drives the light source 14 via the light-source driving unit 13.

According to the above-described first embodiment of the display apparatus of the present invention, even in the case of the micro mirror in which the relationship between the mirror driving signal and the generation amount of the driving torque in the nonresonant mode becomes uncorrelated, the driving torque in the nonresonant mode can be controlled finely. As a result, it becomes possible to implement the fluctuation operation of the micro mirror which results in a desired displacement.

Also, even in the nonresonant mode in which the displacement and the retention are repeated, there exists a transition time-interval during which the fluttering-like variation of the operation disappears and the resultant stable retention appears, and this transition time-interval becomes an obstruction against the higher-rate operation. The application of the embodiment of the present invention, however, allows the driving torque to be suppressed finely. As a result, it becomes possible to reduce the fluttering-like variation in the micro-mirror operation.

Consequently, it becomes possible to shorten the nondisplay time-interval during the transition time-interval. Also, it becomes possible to achieve an extension of the stable retention time, or higher repetition rate of the displacement and the retention. Also, in the embodiment of the display apparatus of the present invention where the fluctuation in the resonant mode is used for the horizontal scan, and where the fluctuation in the nonresonant mode is used for the vertical scan, the above-described extension of the stable retention time is the extension of time capable for effective used during the horizontal scan time-interval, and also is an increase in the display information amount. This, eventually, makes it possible to achieve an extension of the display area 17 illustrated in FIG. 1 into the horizontal direction.

Meanwhile, the higher-rate implementation of the fluctuation rate in the nonresonant mode is an enhancement in the vertical scan rate, and achievement of an increase in the display frame number per time. Moreover, in the case where the nonresonant mode is divided into the image display time-interval and the nondisplay time-interval fly-back, it also becomes possible to shorten the nondisplay time-interval. This makes it possible to achieve a high-resolution implementation of a displayed image, or a reduction in the visibility of the flicker.

Embodiment 2

Figure 2:
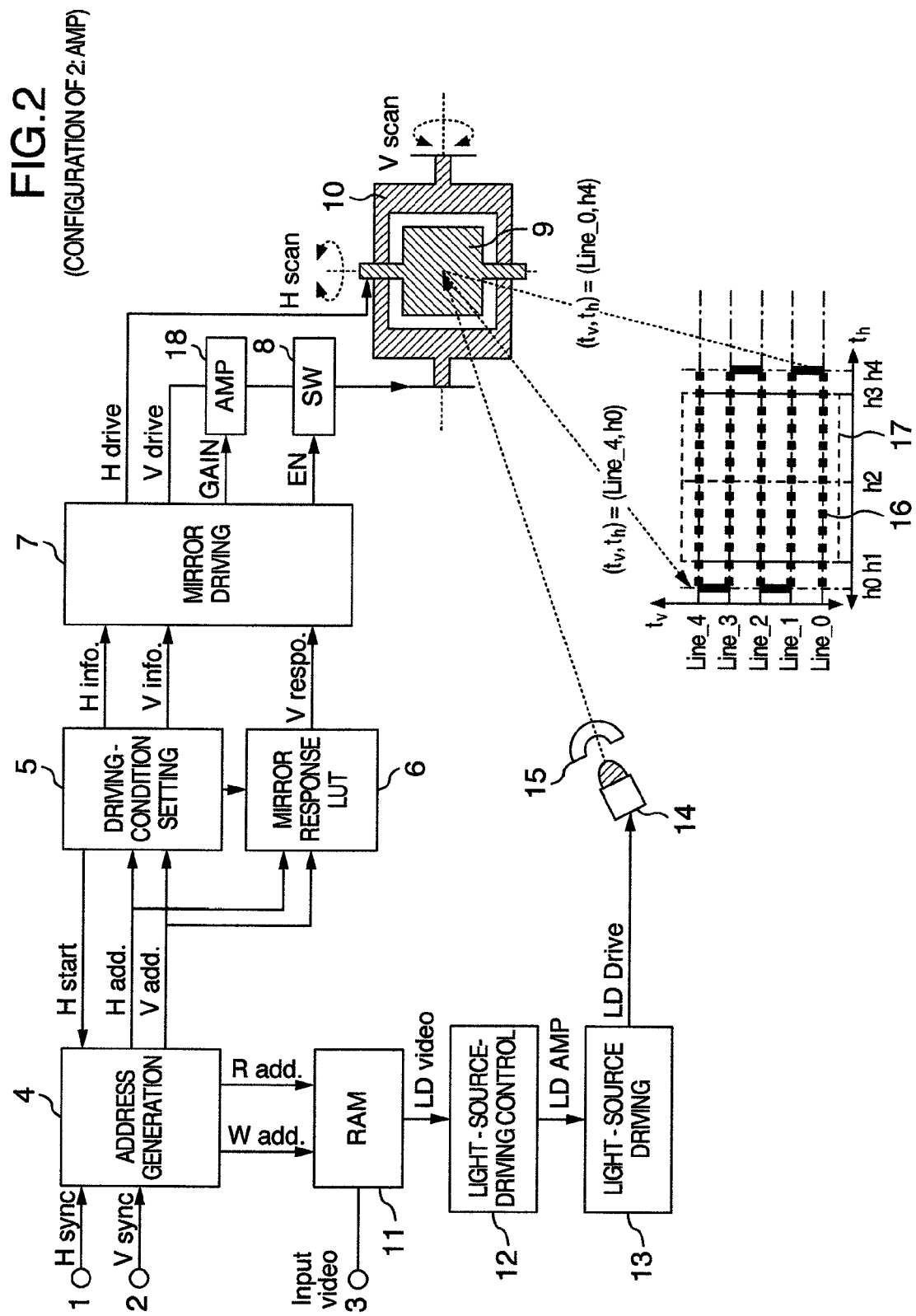
FIG. 2 is a configuration diagram of a second embodiment of the display apparatus according to the present invention.

FIG. 2 illustrates a block diagram for illustrating a second embodiment of the display apparatus according to the present invention. FIG. 7 and FIG. 8 illustrate states before and after corrections for the nonresonant-mode mirror driving signal $V\_{drive}$ and the micro-mirror operational state $V\_{scan}$.

The second embodiment is of a configuration where the modulation unit illustrated in the first embodiment of the display apparatus of the present invention is replaced by an amplification unit 18 for increasing and decreasing the transmission amount of the nonresonant-mode mirror driving signal $V\_{drive}$, or of a configuration where the amplification unit 18 is added to the first embodiment. Having acquired the modulation amount $V_{respo}$ from the mirror response LUT 6, the mirror driving unit 7 determines an amplification degree GAIN for the mirror driving signal $V\_{drive}$ within a range of 0 times to 2 times, thereby controlling the amplification unit 18.

This makes it possible to suppress and amplify the transmission amount of the nonresonant-mode mirror driving signal $V\_{drive}$. In this case, the generated driving torque for the micro mirror is continuous in time.

FIG. 7 illustrates a state where displacement amounts $\Delta d$ of the micro mirror are different from each other for each line ($\Delta d1\text{-}2 \neq \Delta d0\text{-}1$) in a case where the increasing and decreasing amounts $\Delta V$ of the mirror driving signal $V\_{drive}$ are equal to each other for each line.

FIG. 8 illustrates an example of a state where the increasing and decreasing amount is 0.7 times on Line_1 and the increasing and decreasing amount is 1.2 times on Line_2 ($\Delta V1\text{-}2 \neq \Delta V0\text{-}1$), which is implemented in order that the displacement amounts $\Delta d$ of the micro mirror according to the present embodiment become equal to each other for each line by making the increasing and decreasing amounts ΔV of the mirror driving signal $V\_{drive}$ different from each other for each line. Of course, any configuration is allowable as long as it determines the increasing and decreasing amounts ΔV of the mirror driving signal $V\_{drive}$ in the line unit or within a line so that the displacement amounts Δd of the micro mirror become equal to each other for each line. Accordingly, the increasing and decreasing amounts are not at all limited to the range of 0 times to 2 times, but its optimization is performed depending on the driving method and the shape of micro mirror.

According to the second embodiment of the display apparatus of the present invention, even in the case of the micro mirror in which the relationship between the mirror driving signal and the generation amount of the driving torque in the nonresonant mode becomes uncorrelated, the driving torque in the nonresonant mode can be controlled finely and continuously in time. As a result, it becomes possible to implement the fluctuation operation of the micro mirror which results in a desired displacement.

Embodiment 3

FIG. 3 illustrates a block diagram for illustrating a third embodiment of the display apparatus according to the present invention.

The third embodiment is of the following configuration: In addition to the first and second embodiments, a line sensor 19 which is configured by arranging a plurality of light reception units in a line, and a position detection unit 20 for identifying, from a detection result by the line sensor 19, the position of a light reception unit which has received light, are further provided within an area including the scan trajectory 16 which is illuminated by the reflected light from the micro mirror 9. The line sensor 19 is disposed such that the light beam, which is emitted from the light source and reflected by the micro mirror, is received in a direction in which the micro mirror operates in the nonresonant mode. Also, the individual light reception units are disposed such that a displacement in the nonresonant mode can be decomposed sufficiently.

The position detection unit 20 identifies the fluctuation position in the nonresonant-mode direction. With reference to the mirror response LUT 6 and the modulation unit 8, the transmission amount of the nonresonant-mode mirror driving signal $V\_{drive}$ is controlled so that the fluctuation position becomes a desired fluctuation position.

According to the above-described third embodiment of the display apparatus of the present invention, it becomes possible to detect the operational state and position of the micro mirror, and the driving torque for the micro mirror can be suppressed more finely. Consequently, it becomes possible to implement the fluctuation operation of the micro mirror which results in a desired displacement.

The line sensor 19 has been explained as being disposed in a part of the projection area. The configuration, however, is of course not limited thereto. Namely, even if the line sensor 19 is disposed outside the display area 17, any configuration is allowable as long as the line sensor 19 is disposed within an area where the reflected light from the panel exists, i.e., as long as detection result can be obtained.

Embodiment 4

FIG. 4 illustrates a block diagram for illustrating a fourth embodiment of the display apparatus according to the present invention.

In FIG. 4, the light-source-driving controlling unit 12, the light-source driving unit 13, and the light source 14 indicated in the third embodiment of the display apparatus of the present invention are provided corresponding to at least three primary colors of R/G/B. There are further provided an address generation unit for generating address information by acquiring an external image signal and identifying an operational position of the reflected light which performs the reciprocating vibration on one axis or two axes, and image-signal conversion units 21, 22, and 23 for selecting an image signal at a position corresponding to the present address information and modulating the light amount for each R/G/B light source based on brightness information on each R/G/B image signal, are provided, and the reflected light, which is modulated based on the reciprocating vibration position and the image signal, is projected and displayed.

According to the above-described fourth embodiment of the display apparatus of the present invention, the implementation of the stable and high-rate fluctuation operation allows to reduce the flicker, which is a blinking of the screen, more significantly than conventionally. Also, it makes it possible to reproduce the high-quality image display where arrangement of the pixels is uniform.

Incidentally, the above-described mirror driving unit is a unit for driving the mirror such that the mirror vibrates in at least the nonresonant mode, however, it may also include a unit for driving the mirror such that the mirror vibrates in the resonant mode.

Furthermore, when driving the mirror such that the mirror vibrates by using the mirror driving unit, the mirror driving unit may also be a unit for driving the mirror on one axis, two axes, or three axes. Here, the one axis, two axes, or three axes may also be made to correspond to, e.g., any axis of the X-axis, Y-axis, or Z-axis.

Of course, the mirror driving unit in the present embodiment is not limited to the above-described detailed correspondence to the one axis, two axes, or three axes. As long as the mirror driving unit is a unit capable of carrying out the above-described embodiments based on the present invention, it is included within the scope of the present invention.

According to the display apparatus of the present invention, even in the case of the micro mirror in which the relationship between the mirror driving signal and the generation amount of the driving torque in the nonresonant mode becomes uncorrelated, the driving torque in the nonresonant mode can be controlled finely. As a result, it becomes possible to implement the fluctuation operation of the micro mirror which results in a desired displacement.

Also, even in the nonresonant mode in which the displacement and the retention are repeated, there exists the transition time-interval during which the fluttering-like variation of the operation disappears and the resultant stable retention appears. This transition time-interval becomes an obstruction against the higher-rate operation. The application of the embodiment of the present invention, however, allows the driving torque to be controlled finely. As a result, it becomes possible to reduce the fluttering-like variation in the micro-mirror operation.

Consequently, it becomes possible to shorten the nondisplay time-interval during the transition time-interval. Also, it becomes possible to achieve an extension of the stable retention time, or the higher repetition rate of the displacement and the retention.

Also, in the embodiment of the display apparatus of the present invention where the fluctuation in the resonant mode is used for the horizontal scan, and where the fluctuation in the nonresonant mode is used for the vertical scan, the above-described extension of the stable retention time is the extension of time capable for effective use during the horizontal scan time-interval, and also is an increase in the display information amount. The higher-rate implementation of the fluctuation rate in the nonresonant mode is an enhancement in the vertical scan rate, and this makes it possible to achieve an increase in the display frame number per time. This also makes it possible to achieve a high-resolution displayed image, or a reduction in the visibility of the flicker.

The present invention is applicable to the above-described embodiments, and, e.g., an illumination apparatus for rear-surface projection or entire-surface projection image display apparatus using laser light source, and a backlight unit for liquid-crystal television.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mirror driving method of driving a scanning reflection mirror which is fluctuated to project illumination light from a light source, comprising the steps of:
   determining a driving condition for a mirror driving signal for setting said mirror into a predetermined displacement, said mirror being vibrated in a nonresonant mode; and
   controlling transmission amount of said mirror driving signal so that a driving torque for driving said mirror changes by a predetermined magnitude.

2. The mirror driving method according to claim 1, further comprising the steps of:
   making reference to a look-up table (LUT) which indicates relationship of response of said mirror driving to a predetermined driving condition; and
   controlling said transmission amount of said mirror driving signal by making reference to said look-up table, so that generation of a driving torque is reduced with respect to a driving condition that provides a displacement enabling said mirror to perform a desired vibration operation.

* * * * *